Dec. 23, 1952     T. C. TAYLOR     2,622,937
PREVENTION OF EROSION IN PIPE LINES
Filed May 31, 1949
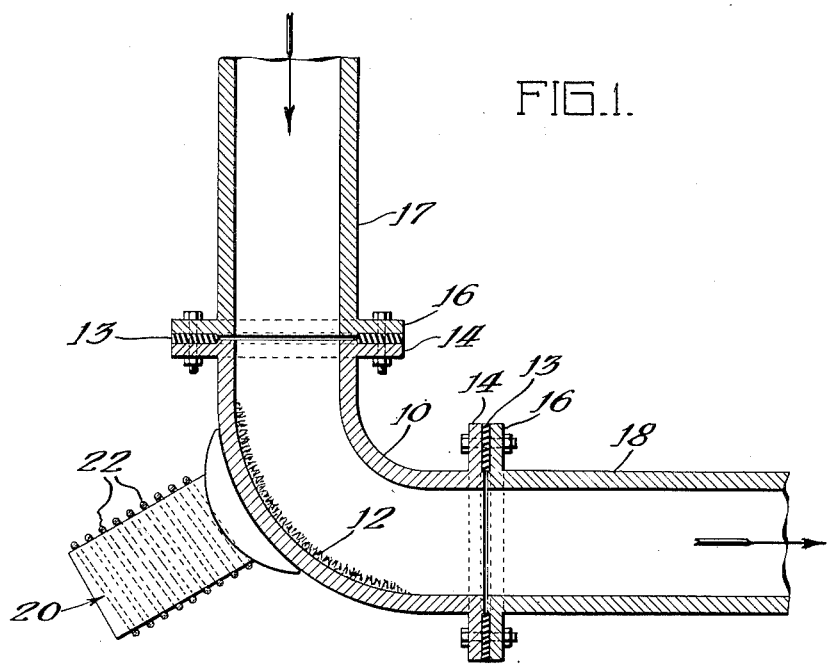
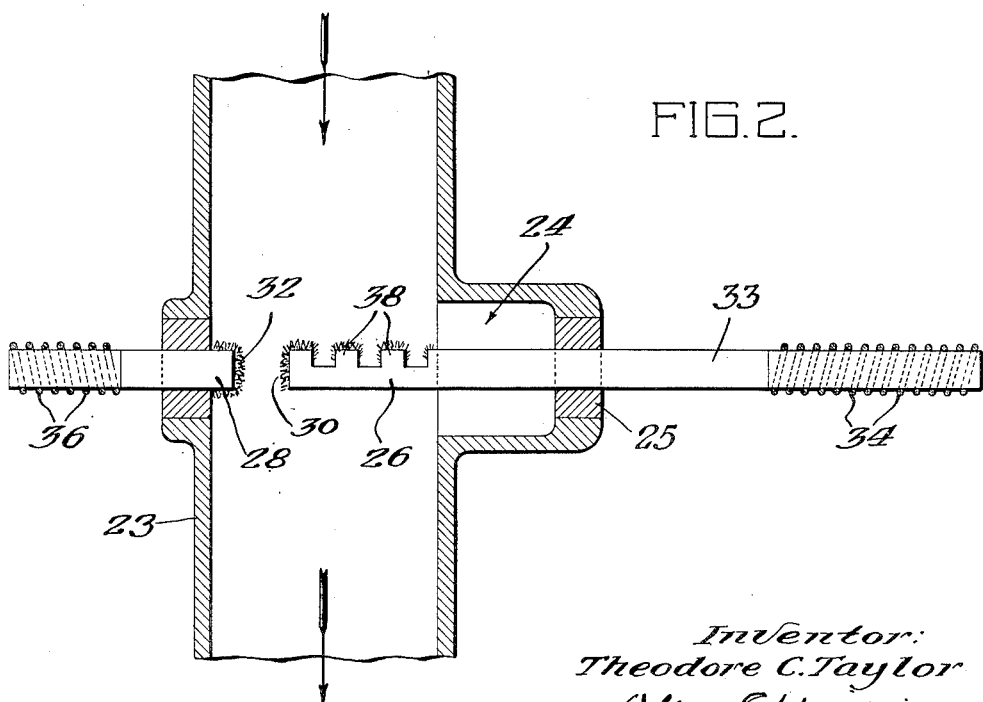
Inventor:
Theodore C. Taylor
By: Olin E. Williams
Attorney Patented Dec. 23, 1952

2,622,937

UNITED STATES PATENT OFFICE 2,622,937

PREVENTION OF EROSION IN PIPE LINES

Theodore C. Taylor, Chicago, Ill., assignor to Standard Oil Company, Chicago, Ill., a corporation of Indiana Application May 31, 1949, Serial No. 96,171

3 Claims. (Cl. 302—64)

This invention relates to a method and means for preventing erosion of conduits, valves and the like that are employed in transporting fluidized solids.

The employment of solids in various industrial processes wherein the solids are finely divided and are fluidized in a stream of gases has become widespread, especially in such instances as catalytic reactions, wherein the catalyst is a fluidized solid, or where fluidized solids are employed to effect heat interchange. In the well known and widely developed catalytic cracking process, for example, silica-alumina, silica-magnesia or like catalysts are recirculated as fluidized solids between a reaction zone and a regeneration zone. In this and many other instances in which abrasive catalysts are employed, it has been found that severe erosion occurs, particularly at pipe bends or upon valve gates or other pieces of conduit equipment which change the direction of flow of the catalyst particles. While protective linings have been devised to protect these surfaces, shutdowns are required so that exposed surfaces can be reached for application or repair of such linings. It is not feasible to line conduits at every possible point of wear, and oftentimes breakdowns occur in unexpected places. Shutdowns consequently occur. An object of the invention is to avoid the necessity of such shutdowns.

A primary object of the present invention is the provision of method and means of preventing and reducing erosion in fluidized-solids conduit systems.

Another object of the present invention is the provision of a method and means whereby conduit-equipment erosion can be prevented or reduced by apparatus externally applied to the equipment and by a method not requiring shutdown of the equipment.

A further object of the invention is the provision of resilient, yieldable protective cushions that are externally controlled and can be maintained at selected thicknesses at selected points in a conduit system.

Other objects and advantages will appear in the remainder of the specification and in the claims.

Briefly stated, the foregoing objects are accomplished by applying a permanent magnet or electromagnet to the exterior surface of conduit equipment, supplying to the inner surface of the equipment or to that surface of equipment which is subjected to erosion, a layer of magnetically responsive solid particles and holding the said layer upon the surface by producing a magnetic flux in or through the protected equipment. The solid particles can be a portion of the transported fluidized-solids catalyst or heat transfer body, or the like when these fluidized solids happen to be magnetic, in which case a magnetic force of only sufficient strength to cause the adherence of a thin layer of particles would be applied to the conduit equipment. In cases wherein the fluidized solids are not magnetic the magnetic solids will be separately added to the system and be held apart and prevented from mixing to any substantial degree with the transported fluidized solids by the magnetic force exerted upon magnetic particles at the point of erosion. The conduit system does not need to be opened directly at the point of erosion in order to introduce the particles but can be delivered into the system at any convenient point upstream of the point of erosion. The transported fluidized solids referred to herein and in the claims are carried as a moving mass in the gas streams and in the pipe lines which they erode. These particulate solids may constitute a portion of the solids used in fluid bed systems, moving-bed systems or in any other process in which finely divided abrasive solids are used and are transferred in fluid streams. Improved adherence for a magnetic field of given intensity is obtained by adding some magnetic particles of larger size than that of the remainder of the particles.

When the conduit being protected consists of a magnetic metal, that is to say, one of high permeability such as iron or steel, my method is effective because the flux induced in the iron or steel will produce a secondary magnetic field which will hold the magnetic cushion in place. To reduce power consumption it is preferable however to use non-magnetic materials. For example, it has been found preferable to employ a non-magnetic valve casing and non-magnetic bushings when a valve gate is to be protected with a cushion of magnetized particles and the magnetic flux is directed thereto through a magnetized valve stem. If a pipe bend or elbow is the structure to be protected, it may be preferable to use a non-magnetic metal elbow or to separate the elbow or the pipe bend from the remainder of the pipe with non-magnetic material to prevent excessive flux leakage. In each application, therefore, the preferred arrangement of conduit equipment will become apparent in the light of the teachings of the present application and the invention is not limited to any such particular arrangement.

It has been found that the yieldable and resilient nature of layers of thickly packed vertically extending iron filings are remarkably resistant to the effects of erosion. Even though magnetic particles are relatively soft compared to the fluidized solids that have created the erosion problem, and although the particles which are held to the protected surface by magnetic force are of course held with only a fraction of the intermolecular force exerted in the actual body of the pipe or like element, the yieldable and resilient magnetized cushion will be held protectively against the body of the pipe and, surprisingly, prevent erosion of the more-strongly held surface.

In the accompanying drawing in which there is shown, for purposes of illustration and clarity, two embodiments of the present invention:

Fig. 1 is a cross sectional elevation of a pipe bend and attached section of piping and magnetic equipment applied to the pipe bend, and Fig. 2 is a cross sectional elevation of a gate valve in a pipe section in which the valve gate and the valve seat are protected by a magnetized cushion.

A pipe bend or elbow 10 is shown to contain a protective cushion of iron particles 12 upon the inner surface of its wider bend. The pipe bend 10 can be constructed of a magnetic or non-magnetic material. The bend can be isolated and leakage of magnetic flux to the rest of the pipe can be avoided by disposing a non-magnetic material, such for example as an asbestos or synthetic rubber gasket 13, between the flanges 14 of the pipe bend 10 and flanges 16 of adjoining pipes 17 and 18. When welded joints are used it is found that the magnetic flux from an external magnet will nevertheless be sufficiently concentrated to effect a laying down of a magnetic cushion upon only the protected area. An electromagnet 20 having an exciting coil 22 connected to a direct-current power source not shown is placed against the outer surface of the pipe bend at a point subject to considerable erosion. It is to be observed that under the influence of the direction of flow of the fluidized solids in the pipe bend 10, as indicated by arrows at the entrance and exit of the illustrated pipe section, the magnetized cushion tends to be distributed in the direction of the flow and this streamlining enhances the resistance of the said cushion to the erosion effect produced by the conduit fluidized solids.

A fundamental and perhaps the outstanding advantage of this method and means for protection is, however, the fact that no amount of erosion will affect the strength of the magnetic flux, or the force by which the cushion is held to the pipe surface, and therefore, after many days or months of service the cushion will be equally capable of providing protection and equally capable to extract from the fluidized solids any iron particles which may have come from erosion at other points. Loss of iron particles from the magnetic cushion during operation can be held to a barely discernible minimum by maintaining an adequate intensity of magnetic flux.

In Fig. 2 in which a pipe section 23 is shown containing a gate valve 24 that is schematically illustrated in a most simplified manner with all non-essential parts broken away, both the valve gate 26 and the valve seat 28 of the gate valve 24 are protected by protective cushions 30 and 32 of iron particles. The rod forming the stem 33 of the valve 24 and the valve gate 26 can be isolated from the pipe section 23 by non-magnetic bushings 25.

The protective apparatus of Fig. 2 illustrates a quite different application of the magnetized cushion than that shown in Fig. 1. In Fig. 2 the valve stem 33 and rod forming the valve seat 28 are themselves used as electromagnets by wrapping coils 34 and 36 around the external sections of the valve stem 33 and valve seat 28 respectively, whereas separate magnets are employed when a pipe bend or the like is to be protected and the protected portion may itself often be non-magnetic. The valve gate and seat can be magnetized also by placing a permanent magnet in contact with the stem and rod respectively. The valve gate 26 shown in Fig. 2 is of special design to reduce the reluctance of the up stream surface of the magnetized gate relative to the end so that a more distribution of the magnetic cushion can be had. The surface that is exposed to direct flow of fluidized solids is broken in the form of ridges or segments 33. Any element which extends for a substantial length into the erosive stream should be so designed that relatively uniform coverage of the element with the magnetic cushion can be secured.

The velocities tested of gas-plus-suspended-solids flow were in the range of about 25 to 100 feet per second which would cover substantially all normal industrial operation. At the gas velocities tested, it was found that a thickness of the magnetic cushion of about $\frac{1}{16}$ to $\frac{1}{8}$ of an inch provided protection against erosion. Regardless of the pipe diameter a densely packed magnetic cushion of as little as $\frac{1}{16}$ inch thickness will provide adequate protection.

It is observed that the operation of such protective cushions is limited to temperature range having an upper limit about 750° C., at which temperature iron is no longer magnetic.

*Example I*

The protective effect of a magnetic cushion on various conduit elements was tested in a series of examples. In one example the erosion of a copper elbow was studied. Fluidized iron oxide suspended in air was passed through the elbow at a velocity of 31 feet per second. After a period of 1 hour 105 parts by weight of metal was eroded from the copper elbow. In another hour under exactly the same conditions, 111 parts by weight of the copper was eroded from the pipe bend. Similar subsequent examinations indicated a relatively uniform rate of erosion. When using the same elbow and supplying thereto a magnetic cushion of iron and iron oxide particles to protect the inner surface of the copper elbow, the rate of erosion was reduced to one-third the former rate. The magnetic force employed to retain the magnetic cushion against the elbow was supplied by a cast Alnico permanent magnet manufactured by General Electric Company and having a composition of approximately 8 parts of aluminum, 14 parts nickel, 24 parts cobalt, 3 parts copper and the balance is iron. The maximum magnetic force of the said magnet was 2,000 oersteds and maximum intensity generatable was 15,700 gausses.

*Example II*

In another example a fluidized stream containing 90% of silica-magnesia catalyst and 10% of iron oxide was passed at selected velocities through an elbow in order to determine at what flow rates the small permanent magnet above described could effect a building up of a magnetic cushion and at what velocities the cushion would remain in position. The cushion itself consisted of iron oxide particles pulled from the fluidized-solids stream. In a series of three tests in which the magnet was placed in the first instance ahead of the pipe bend, in the second instance after the pipe bend and in the third instance at the pipe bend, no substantial deviation was found in the following values: Average maximum velocity for build-up to occur—17.3 feet per second; Average maximum velocity at which magnetic cushion will remain in place—31.6 feet per second.

*Example III*

Under conditions the same as employed in Example II and in which a fluid stream of 90% silica-magnesia catalyst plus 10% magnetically responsive partially oxidized iron particles was employed, an addition of iron filings of somewhat larger size than the iron particles was added to the fluidized-solids stream. The filings were within the size range of about $\frac{1}{16}$ inch in their greatest dimension. About 50 per cent of the partially oxidized iron particles would pass through a 325 mesh screen and substantially none of the particles were above 65 mesh. This addition of solids greatly increased the ability of the above fixed magnet to cause the build-up of a magnetic cushion and it was found that at velocities of 48, 50 and 48 feet per second the cushion could be formed at the magnet positions respectively, ahead of the pipe bend, after it, and at the bend. It is believed that the larger particles first become attached to the magnetized surface and then attract the smaller particles to them.

The foregoing values indicate that it is preferable to employ for such magnetic cushions particles of various size, particularly at positions in a fluidized-solids transporting system wherein higher velocities are encountered.

*Example IV*

A valve gate of cold-rolled steel was subjected to a fluidized-solids stream flowing past the gate at a velocity of 60 feet per second. In one instance the said magnet was not applied and in the second it was used to provide a protective cushion on the gate. The use of the magnet reduced the rate of erosion to one-fifth that formerly obtained. It is believed that this protection could be greatly increased by adopting a design similar to that shown in Fig. 2, for it was observed in carrying out the above tests that some erosion took place on the flat area of the valve gate where little protection by the magnetic cushion was had. The above example was performed with an iron oxide catalyst constituting the fluidized-solids stream. Further experimentation indicated that the said permanent magnet was able to hold a magnetic cushion on the edge of the valve gate under a pressure of free air velocities as high as 100 feet per second.

*Example V*

Qualitative tests were made to examine the operation of the process in a highly magnetic-permeable steel tube. Inasmuch as the steel tube will conduct away the magnetic flux and prevent its having direct effect upon magnetic particles within the tube, it was found that simply placing one pole of the magnet against the outside of such a tube would not form a magnetic cushion therewithin. It is necessary to place a permanent magnet or to dispose an electromagnet along the steel tube so as to effect a secondary magnetic field having, it appears, a minor pole with the tube. Thus, when the said permanent magnet employed in the above examples was placed with only one pole against a steel pipe through which iron catalyst particles were flowing, no change in the flow was observed. However, when the magnet was placed lengthwise along the steel tube so that both of its poles were substantially in contact with the pipe a cushion of iron particles was formed in a relatively concentrated area at approximately the center between the two said poles.

I claim as my invention:

1. Apparatus for protecting pipe lines and associated equipment from erosion caused by fluidized-solids that are transported, in a gas stream in the said pipe lines, the said apparatus comprising an electromagnetic coil wound upon an element of the pipe line equipment that is electrically insulated from the pipe line and is subjected to erosion so that the element and coil constitute an electromagnet, and a soft, resilient magnetic cushion comprising particles of particulate magnetized material held upon a surface of the said equipment that is subjected to erosion by the magnetic force of said permanent magnet.

2. The apparatus of claim 1 in which the said element is a valve having a valve stem and gate constituting one electromagnet and a valve seat that is a second electromagnet.

3. The apparatus of claim 2 in which the surface of the said gate is broken and forms ridge-like segments whereby a uniform layer of the said magnetic cushion is retained thereon.

THEODORE C. TAYLOR.

REFERENCES CITED

The following references are of record in the file of this patent:

UNITED STATES PATENTS

| Number | Name | Date |
|---|---|---|
| 573,741 | Whitacre et al. | Dec. 22, 1896 |
| 2,350,759 | Hilmer et al. | June 6, 1944 |
| 2,578,003 | Garbo | Dec. 11, 1951 |

FOREIGN PATENTS

| Number | Country | Date |
|---|---|---|
| 491,920 | Germany | Feb. 14, 1930 |